United States Patent
Lee et al.

(10) Patent No.: US 6,875,026 B2
(45) Date of Patent: Apr. 5, 2005

(54) HARD DISK DRIVE WITH CONNECTORS THAT SIMPLIFY ASSEMBLY

(75) Inventors: Bong-Jin Lee, Seoul (KR); Young-Sub Ahn, Suwon (KR)

(73) Assignee: Samsung Electronics Co., LTD, Suwon-si (KR)

( * ) Notice: Subject to any disclaimer, the term of this patent is extended or adjusted under 35 U.S.C. 154(b) by 0 days.

(21) Appl. No.: 10/388,747

(22) Filed: Mar. 17, 2003

(65) Prior Publication Data

US 2003/0142243 A1 Jul. 31, 2003

Related U.S. Application Data

(63) Continuation of application No. 08/876,179, filed on Jun. 13, 1997, now abandoned.

(30) Foreign Application Priority Data

Jun. 14, 1996 (KR) .............................................. 96-21577

(51) Int. Cl.⁷ ............................................... H01R 12/00

(52) U.S. Cl. ....................................................... 439/74
(58) Field of Search ............................... 439/65, 66, 67, 439/68, 71, 81, 82, 77, 78, 83, 660, 632, 630

(56) References Cited

U.S. PATENT DOCUMENTS 5,378,160 A  *  1/1995  Yumibe et al. ................ 439/66
5,685,726 A  *  11/1997  Lwee et al. .................... 439/83

* cited by examiner

*Primary Examiner*—Ross Gushi
(74) *Attorney, Agent, or Firm*—Robert E. Bushnell, Esq.

(57) ABSTRACT

A connector apparatus of a hard disk drive allows a connector to automatically contact a flexible printed circuit board upon combining a printed circuit board with a head/disk assembly. The connector apparatus includes a printed circuit board with the connector mounted thereon, and a head/disk assembly with the flexible printed circuit board mounted thereon. The connector includes a plurality of hooklike terminals for automatically connecting with the flexible printed circuit board when combining the printed circuit board with the head/disk assembly.

16 Claims, 8 Drawing Sheets

HARD DISK DRIVE WITH CONNECTORS THAT SIMPLIFY ASSEMBLY

CROSS-REFERENCE TO RELATED APPLICATIONS

This application is a continuation of applicant's Ser. No. 08/876,179 filed in the U.S. Patent & Trademark Office on 13 Jun. 1997, now abandoned and assigned to the assignee of the present invention.

CLAIM OF PRIORITY

This application makes reference to, incorporates the same herein; and claims all benefits accruing under 35 U.S.C. § 119 and § 120 from an application for Connector Apparatus of Hard Disk Drive earlier filed in the Korean Industrial Property Office on 14 Jun. 1996 and there duly assigned Serial No. 21557/1996.

FIELD OF THE INVENTION

The present invention relates generally to a hard disk drive used as an auxiliary memory device for a computer, and more particularly, to a connector apparatus for connecting a printed circuit board to a head/disk assembly.

BACKGROUND OF THE INVENTION

Commonly, a hard disk drive used as an auxiliary memory for a computer is made up of a head/disk assembly (commonly called HDA for short) and a printed circuit board assembly (commonly called PCBA for short) for controlling the head/disk assembly.

The head/disk assembly includes a spindle motor for revolving a magnetic disk at a regular speed, and an actuator serving as a carriage for actuating a head to read and write data to or from the magnetic disk. The printed circuit board assembly includes various kinds of electric circuits for controlling the spindle motor, the actuator, the head, and the like. Such a printed circuit board assembly is electrically connected to the head/disk assembly via a connector.

Further, the spindle motor, the actuator, and the head have respective input/output connectors for permitting a signal communication between the head/disk assembly and the printed circuit board assembly. For example, the signals communicated between the head/disk assembly and the printed circuit board assembly include a current signal applied to U, V, and W-phases for the spindle motor and a voice coil motor, and a head signal for a read/write operation. Such signals are generally communicated through the connectors.

U.S. Pat. No. 5,420,733 for an Electrical Connector That Is Fastened to a Hard Disk Drive Housing by Pins That Extend From a Housing and are Inserted Into Corresponding Connector Apertures to Knighton et al. and U.S. Pat. No. 5,392,175 for a PCMCIA Type HDD Connector Mount to Beecroft each disclose connector pins used in the assembly process of a hard disk drive. U.S. Pat. No. 5,500,779 for a Disk Drive Memory Card Electrical Interconnect to Diel discloses curved connectors used in the assembly of a hard disk drive. I have found that conventional design practice as represented by the foregoing references fail to provide connectors that automatically electrically couple the head/disk assembly to a printed circuit board when mounted together.

SUMMARY OF THE INVENTION

It is therefore an object to provide a connector apparatus of a hard disk drive, in which an electrical connection between a head disk assembly and a flexible printed circuit board is automatically made upon mounting a printed circuit board on a head/disk assembly.

It is another object to provide a connector apparatus of a hard disk drive having an improved yield.

It is still another object to provide a connector apparatus of a hard disk drive, having a low rate of inferior manufactured goods.

According to an aspect of the present invention, a connector apparatus of a hard disk drive is made up of a printed circuit board including a multi-pin (e.g. a 4-pin) connector mounted thereon, and a head/disk assembly including a flexible printed circuit board mounted thereon, in which the multi-pin connector automatically contacts the flexible printed circuit board when combining the printed circuit board with the head/disk assembly.

The multi-pin connector includes a plurality of hooklike terminals for securing a firm contact with the flexible printed circuit board. The hooklike terminals each comprise a bent portion being elastically bent downward, to prevent said flexible printed circuit board from being damaged.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 5A and 5B are an enlargement of the 4-pin connector illustrated in FIG 4.

DETAILED DESCRIPTION OF THE INVENTION

Figure 1:
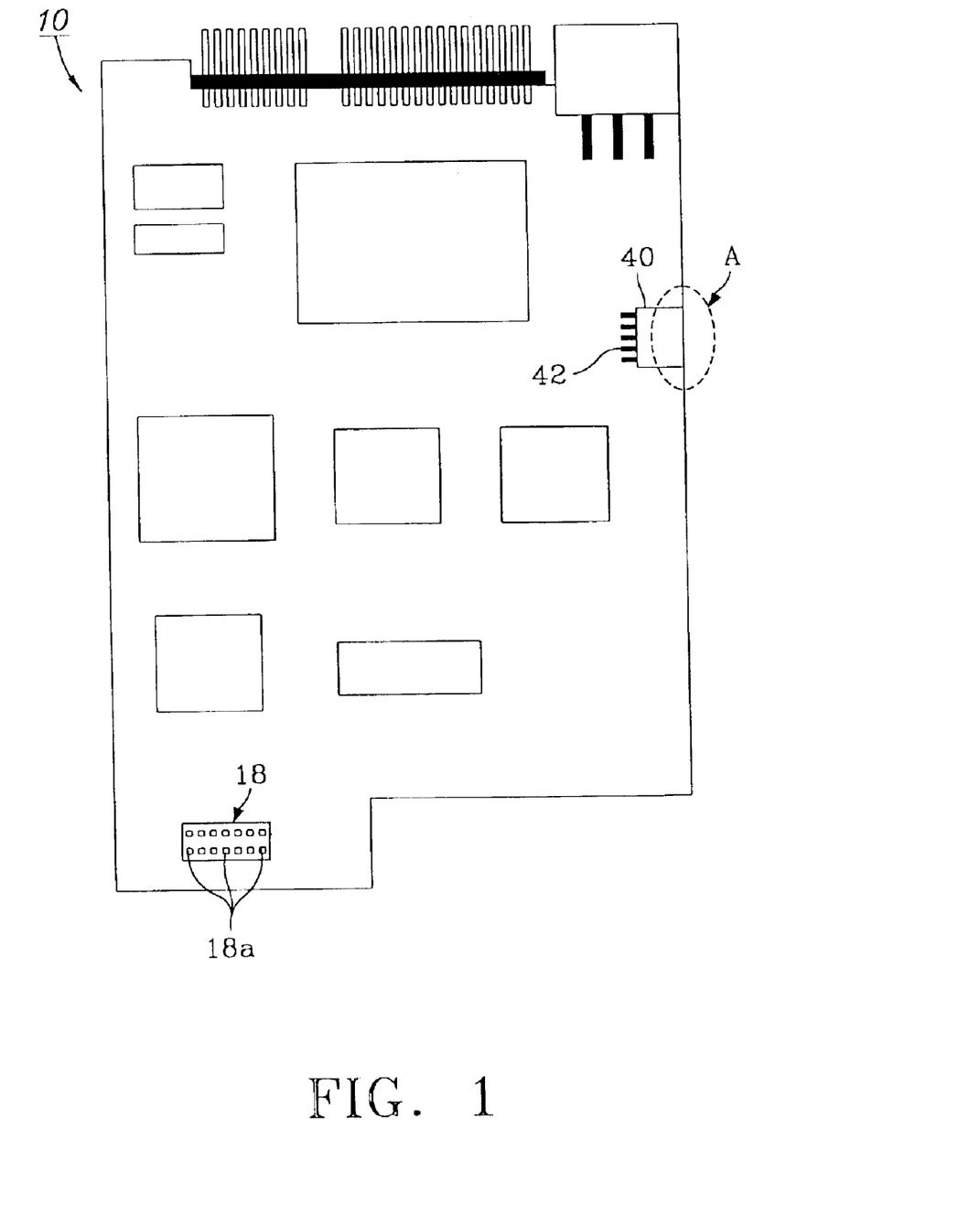
FIG. 1 is a schematic diagram showing a printed circuit board on which a 14-pin connector, integrated circuits, and a 4-pin connector are mounted according to the prior art.
Figure 2:
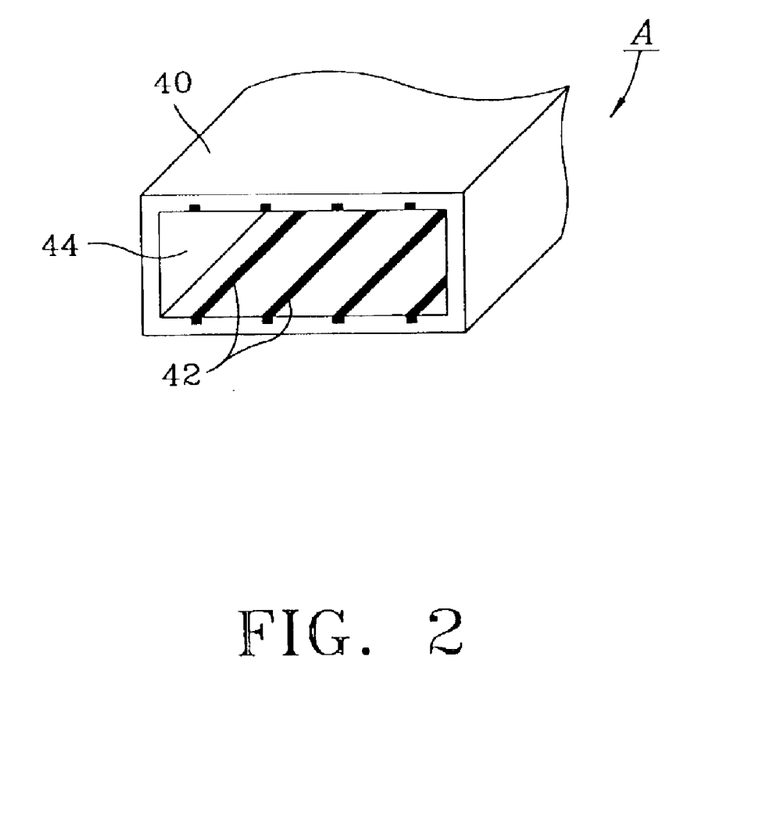
FIG. 2 is an enlargement of A in FIG. 1 showing the 4-pin connector.
Figure 3:
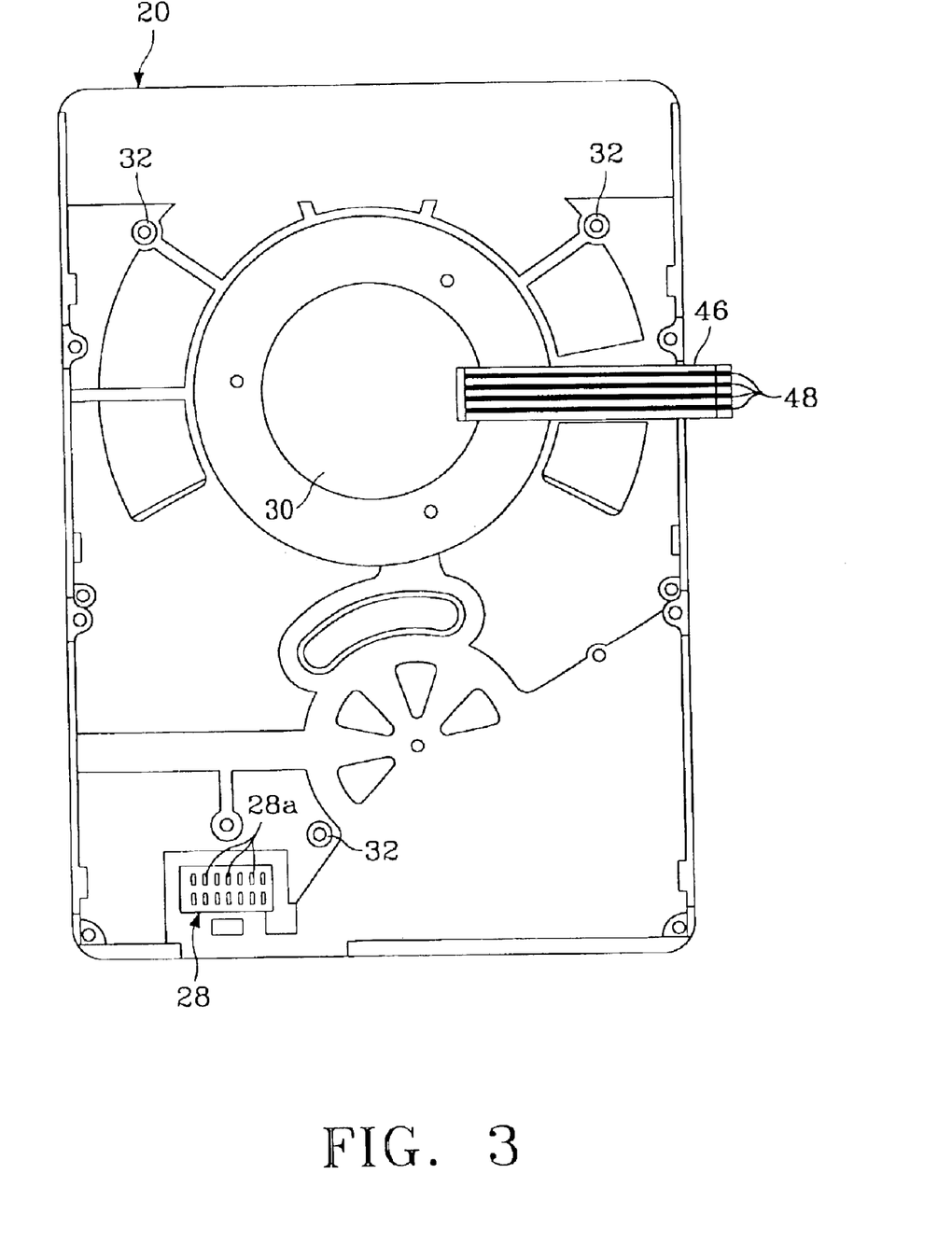
FIG. 3 is a schematic diagram showing a head/disk assembly on which a 14-pin head and a flexible printed circuit board are mounted according to the prior art.

Referring to FIGS. 1 through 3, an earlier printed circuit board 10 includes a 4-pin connector 40 for transferring signals to a head/disk assembly 20, so as to revolve a spindle motor 30 and to generate the U, V, and W-phases. Further, the printed circuit board 10 includes a 14-pin connector 18 with fourteen pin holes 18a for transferring signals to a head to read and write data to and from a magnetic disk.

The 4-pin connector 40, as shown in FIG. 2, includes a cavity 44 into which a flexible printed circuit board 46 is to be inserted. The cavity 44 includes external pins 42 formed on upper and lower inner walls, which are to be connected to contact lines 48 of the flexible printed circuit board 46. Further, various kinds of integrated circuits are mounted on the printed circuit board 10.

The head/disk assembly 20 includes the spindle motor 30 mounted thereon, for revolving the magnetic disk at a constant speed. The flexible printed circuit board 46 for transferring signals to the spindle motor 30 is fixedly mounted on a side of the spindle motor 30. The flexible printed circuit board 46 includes four contact lines 48 formed at an end thereof, which are to be inserted into the cavity 44 of the 4-pin connector 40 to make a contact with the external pins 42.

Further, the head/disk assembly 20 includes a 14-pin head 28 having fourteen pins 28a formed thereon for transferring signals to the head. The pins 28a are to be inserted into the pin holes 18a of the 14-pin connector 18. The head/disk assembly 20 has a plurality of screw holes 32 for fixing the printed circuit board 10 thereto.

Now, a method for assembling the printed circuit board and the head/disk assembly will be described. First, the integrated circuits, the 4-pin connector 40, and the 14-pin connector 18 are mounted on the printed circuit board 10. Besides, the spindle motor 30, the flexible printed circuit board 46, and the 14-pin head 28 are mounted on the head/disk assembly 20.

Thereafter, the printed circuit board 10 is put on the head/disk assembly 20, Then, the pins 28a formed on the 14-pin head 28 are inserted into the pin holes 18a of the 14-pin connector 18, thereby connecting the 14-pin head 28 to the 14-pin connector 18 so as to transfer the signals to the head. Then, the flexible printed circuit board 46 connected to the spindle motor 30 is inserted into the cavity 44 of the 4-pin connector 40. Thus, the external pins 42 formed on the cavity 44 are brought into contact with the contact lines 48 formed on the flexible printed circuit board 46, so that the signals can be transferred to the spindle motor 30. Thereafter, the printed circuit board 10 and the head/disk assembly 20 are fixed together by driving screws through the screw holes 32.

Figure 4:
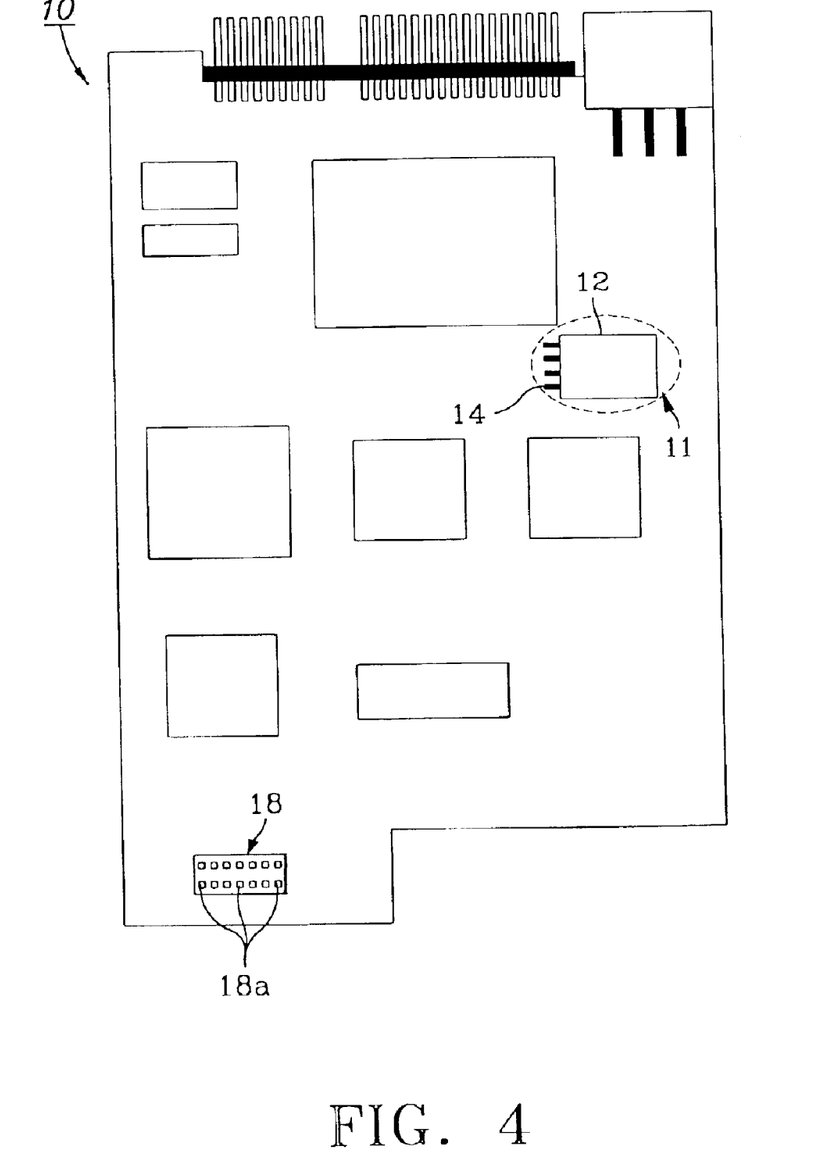
FIG. 4 is a schematic diagram showing a printed circuit board on which a 14-pin connector, integrated circuits, and a 4-pin connector are mounted according to an embodiment of the present invention.

A connector apparatus according to an embodiment of the present invention will be described in detail hereinbelow with reference to the attached drawings, in which the like reference numerals represent the like elements. Referring to FIG. 4, there is illustrated a printed circuit board 10 on which a 14-pin connector 18, various kinds of integrated circuits, and a 4-pin connector 11 are mounted according to an embodiment of the present invention. The 14-pin connector 18 includes fourteen pin holes 18a for transferring signals to a head for reading and writing data to and from a magnetic disk. The 4-pin connector 11 includes hooklike terminals 14 and a fixing member 12 for fixing the hooklike terminals 14, and transfers signals to revolve a spindle motor 30. Further, the 4-pin connector 11 transfers signals to generate U, V, and W-phases for the spindle motor 30.

Figure 6:
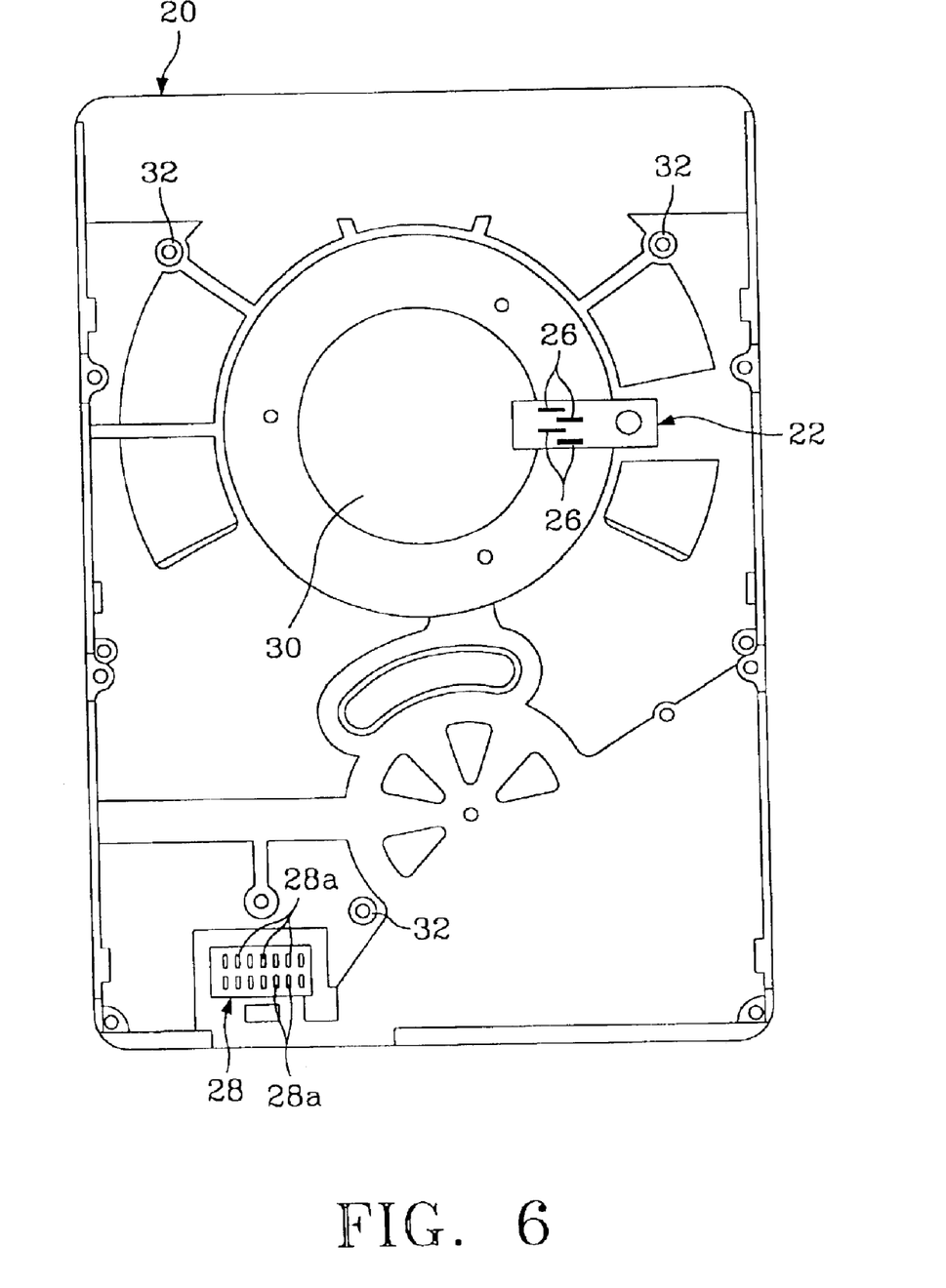
FIG. 6 is a schematic diagram showing a head/disk assembly on which a 14-pin head and a flexible printed circuit board are mounted according to an embodiment of the present invention.

Referring to FIG. 6, there is illustrated a head/disk assembly 20 on which the spindle motor 30, a 14-pin head 28 and a flexible printed circuit board 22 are mounted according to an embodiment of the present invention. The 14-pin head 28 includes fourteen pins 28a to be inserted into the pin holes 18a of the 14-pin connector 18, to transfer signals to the head. The flexible printed circuit board 22 mounted on a side of the spindle motor 30 is to be connected to the 4-pin connector 11 to transfer signals to the spindle motor 30 for revolving the magnetic disk at a constant speed.

As explained earlier herein, the spindle motor, the actuator, and the head have input/output connectors that permit a signal communication between the head/disk assembly and the printed circuit board assembly. The signals communicated between the head/disk assembly and the printed circuit board assembly include a current signal applied to U, V, and W-phases for the spindle motor and a voice coil motor, and a head signal for a read/write operation. Such sinnals are generally communicated through the connectors.

Figure 5A:
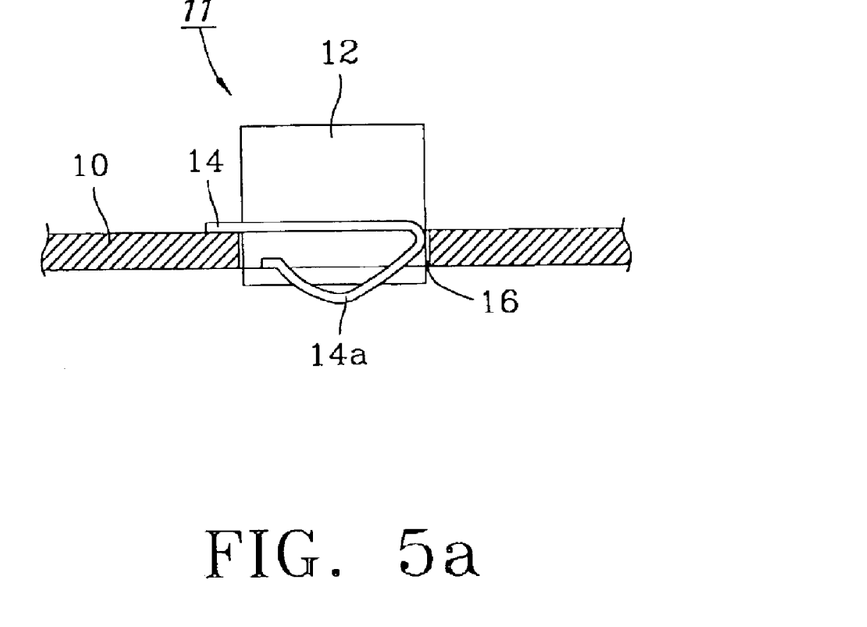
FIGS 5A and 5B are a cross-sectional view and a plan view respectively of the 4-pin connector according to an embodiment of the present invention.
Figure 5B:
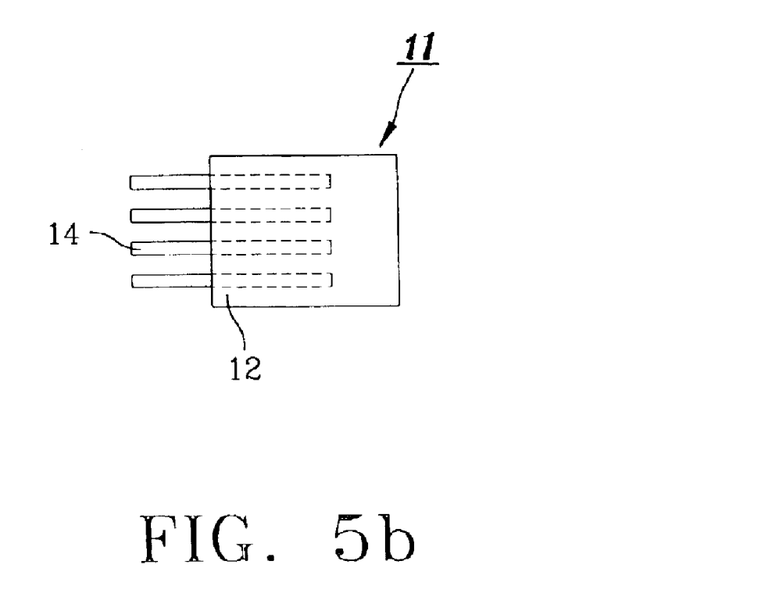

Referring to FIG. 5, the 4-pin connector 11 includes four hooklike (or p-shaped) terminals 14 of which each bent portion 14a extends downwardly at a predetermined angle to secure a firm contact with the flexible printed circuit board 22. The hooklike terminal 14 and the fixing member 12 are formed together in a body by a molding process. The fixing member 12 is mounted on an opening 16 formed at the printed circuit board 10. The bent portion 14a of the hooklike terminal 14 is elastic. Thus, the hooklike terminal 14 can secure a firm contact with the flexible printed circuit board 22 without damaging it.

Also, respective terminals 14 are bent in a p-shape so that the terminal 14 has a certain elasticity, in order to prevent a gap from being generated at the time of combining the printed circuit board 22 with the head/disk assembly 20. In addition, a plurality of terminals 14 is consecutively attached to the fixing member 12 in parallel with one another, as shown in FIG. 5b.

Figure 8A:
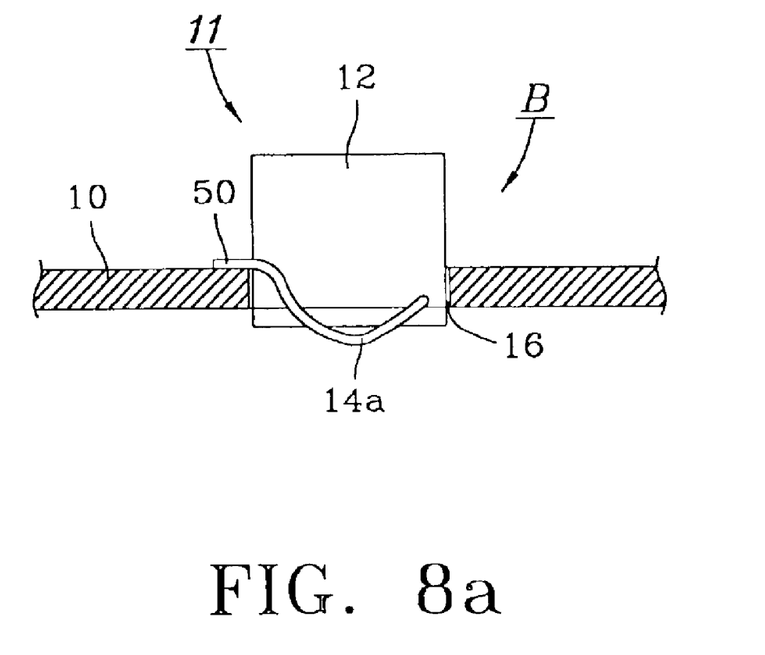
FIGS. 8A and 8B are a cross-sectional view and a plan view of the 4-pin connector according to another embodiment of the present invention.
Figure 8B:
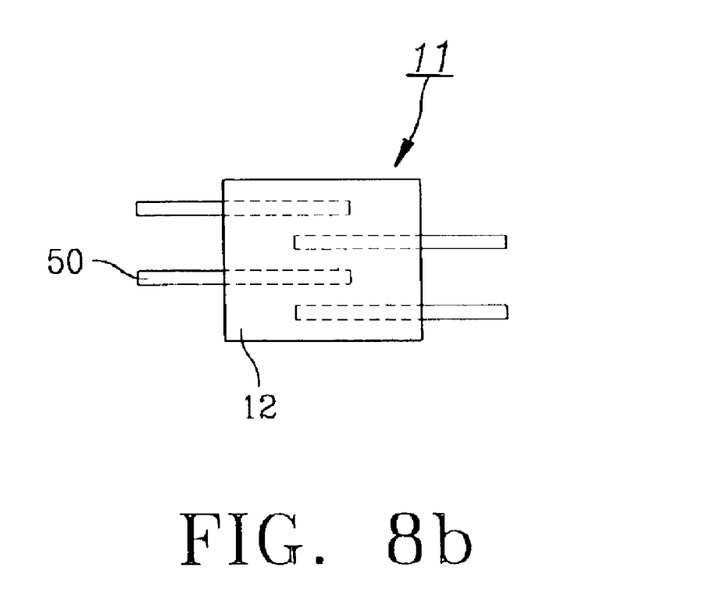

In a second embodiment, terminal 50 installed at the printed circuit board 10 can be bent in a c-shape, as shown in FIGS. 8A and 8B. Also, the terminals 50 are alternately attached to the fixing member 12.

Now, how to assemble the printed circuit board and the head/disk assembly will be described. First, the integrated circuits, the 4-pin connector 11, and the 14-pin connector 18 are mounted on the printed circuit board 10. Then, the fixing member 12 having the hooklike terminal 14 is fixedly mounted on the opening 16 formed at a side of the printed circuit board 10. Besides, the spindle motor 30, the flexible printed circuit board 22, and the 14-pin head 28 are mounted on the head/disk assembly 20.

Figure 7:
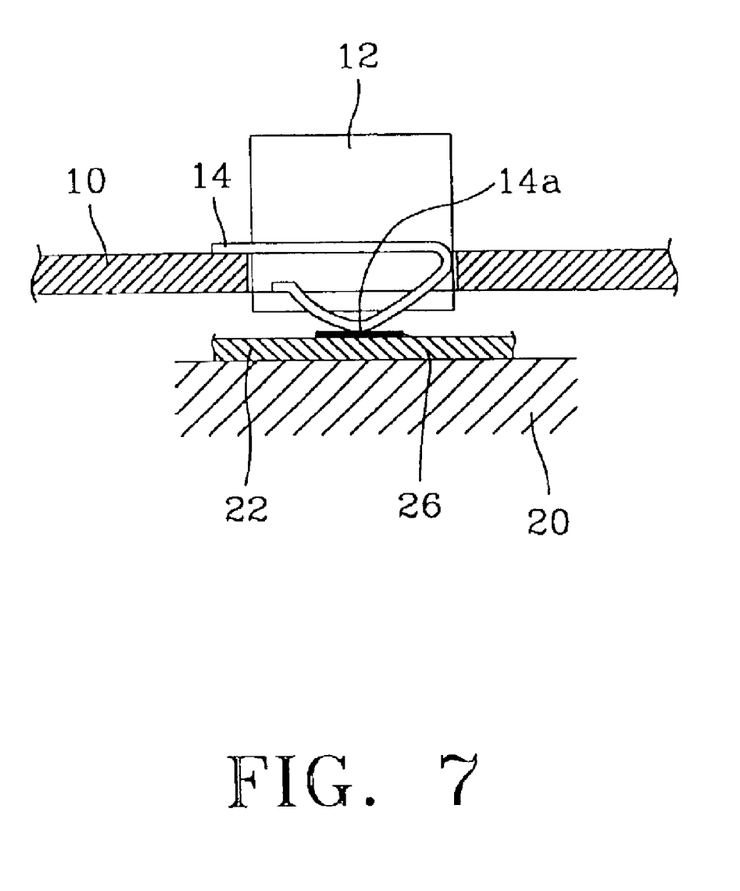
FIG. 7 is a status diagram showing that the 4-pin connector is in contact with the flexible printed circuit board according to an embodiment of the present invention.

Thereafter, the printed circuit board 10 is put on the head/disk assembly 20. Then, the pins 28a formed on the 14-pin head 28 are inserted into the pin holes 18a of the 14-pin connector 18, thereby connecting the 14-pin head 28 to the 14-pin connector 18 to transfer the signals to the head. At this time, the hooklike terminal 14 formed on the fixing member 12 falls down to contact the contact line 26 formed on the flexible printed board 22, as shown in FIG. 7 which illustrates that the 4-pin connector 11 is in contact with the flexible printed circuit board 22. Specifically, the bent portion 14a of the hooklike terminal 14 automatically contacts the contact line 26 of the flexible printed board 22 upon combining the printed circuit board 10 with the head/disk assembly 20, thereby to transfer signals to the spindle motor 30. Thereafter, the printed circuit board 10 and the head/disk assembly 20 are fixed together by driving screws through screw holes 32.

As described in the foregoing, the 4-pin connector includes the hooklike terminal, so that the 4-pin connector may automatically align and electrically contact the flexible printed circuit board when combining the printed circuit board with the head/disk assembly. Therefore, manufacturing throughput may increase and the rate of inferior manufactured products may be reduced.

The preferred embodiment is given by way of example, and as a means of explaining the use and making of the present invention. The embodiment is subject to routine modification by those of ordinary skill in the art. The present invention is not limited to the illustrative embodiments, but is defined by the appended claims.

What is claimed is:

1. A hard disk drive, comprising:
a head/disk assembly which includes a body and a spindle motor supported by said body;
a first connector attached to said body;
a first printed circuit board connected to said spindle motor and having a plurality of contacts mounted on said first printed circuit board;
a second printed circuit board including a second connector engageable with said first connector of said disk assembly; and
a third connector having a plurality of terminals attached to said second printed circuit board, said plurality of terminals of said third connector being positioned on said second printed circuit board so as to automatically electrically engage contacts on said disk assembly without manipulation of said contacts on said disk assembly to transfer signals between said second printed circuit board and said spindle motor when said second connector of said second printed circuit board is engaged with said first connector of said disk assembly;
each of said plurality of terminals having a proximal portion exposed by said third electrical connector;
other portions of said plurality of terminals being in an array conforming to positions of said contacts; and
said proximal portions of said terminals operationally engaging said second printed circuit board, said other portions of said terminals extending through said second printed circuit board to make an operational engagement with corresponding ones of said contacts and to maintain said operational engagement by resiliently deforming while said second connector mates with said first connector.

2. The hard disk drive of claim 1, proximal portions of said plurality of terminals being mounted on said second printed circuit board while other portions of said plurality of terminals are positioned in resilient suspension and spaced-apart from said second printed circuit board.

3. The hard disk drive of claim 1, each one of said plurality of terminals of said third connector having a distal portion resiliently bowed to protrude away from said second printed circuit board toward said first printed circuit board.

4. The hard disk drive of claim 1, each of said proximal portions being disposed to operationally engage said second printed circuit board along a geometric construct, and each of said other portions being bowed to protrude outwardly from said second printed circuit board and to resiliently deform along a direction transverse to said geometric construct as said second electrical connector is operationally mated with said first electrical connector.

5. The hard disk drive of claim 1, each of said plurality of terminals within said third electrical connector having proximal portions of said plurality of terminals exposed by said third electrical connector; other portions of said plurality of terminals being bowed to protrude resiliently beyond said third connector in an array conforming to positions of said electrical contacts.

6. A process for assembling a hard disk drive, comprising:
forming a head/disk assembly by mounting a spindle motor on a body of said head/disk assembly;
attaching a first electrical connector to said body of said head/disk assembly; attaching a first circuit board bearing a plurality of electrical contacts electrically connected to said spindle motor;
assembling a second circuit board by providing a second electrical connector which is engageable with said first electrical connector of said body of said head/disk assembly when said second printed circuit board is attached to said head/disk assembly;
mounting, upon said second circuit board, a third electrical connector having a plurality of resilient terminals attached to said second circuit board; and
automatically electrically engaging said plurality of resilient terminals attached to said second circuit board with contacts on said head/disk assembly by aligning said second electrical connector to operationally mate with said first electrical connector and joining said second circuit board to said head/disk assembly;
said method further comprising establishing each of said plurality of resilient terminals within said third electrical connector with proximal portions of said plurality of resilient terminals exposed by said third electrical connector, bowing other portions of said plurality of resilient terminals to protrude resiliently beyond said third electrical connector in an array conforming to an array of said contacts of said second circuit board, positioning said proximal portions of said plurality of resilient terminals to operationally engage said second circuit board, and positioning said other portions of said plurality of resilient terminals to extend through said second circuit board so as to make an operational engagement with corresponding ones of said electrical contacts and to maintain said operational engagement by resiliently deforming when said second electrical connector operationally mates with said first electrical connector.

7. The process of claim 6, further comprising the step of forming said plurality of resilient terminals of said third electrical connector from a resilient and elastic material.

8. The process of claim 6, further comprising the step of mounting proximal portions of said plurality of resilient terminals on said second circuit board while positioning other portions of said plurality of resilient terminals in resilient suspension spaced-apart from said second circuit board.

9. The process of claim 6, further comprising the step of forming each one of said plurality of resilient terminals of said third electrical connector with a distal portion operationally engaging said second circuit board and with another portion resiliently bowed to moveably protrude away from said second circuit board.

10. The process of claim 6, further comprising the step of forming each of said plurality of resilient terminals with a proximal portion disposed to operationally engage said second circuit board along a geometric construct, and with another portion bowed to protrude outwardly from said second circuit board and to resiliently deform along a direction transverse to said geometric construct as said second electrical connector is operationally mated with said first electrical connector.

11. The process of claim 6, further comprising the steps of:
forming each of said plurality of resilient terminals with a proximal portion exposed by said third electrical connector;

orienting other portions of said plurality of resilient terminals in an array conforming to positions of said contacts; and performing said step of mounting said third electrical connector by positioning said proximal portions of said resilient terminals to operationally engage said second circuit board, said other portions of said resilient terminals extending through said second circuit board to make an operational engagement with corresponding ones of said contacts and to maintain said operational engagement by resiliently deforming while said second electrical connector mates with said first electrical connector.

12. A process for assembling a hard disk drive, comprising:

forming a head/disk assembly by combining a spindle motor and a first circuit board bearing a plurality of electrical contacts electrically connected to said spindle motor, and a body disposed to mount said spindle motor;

assembling a second circuit board by providing it with a second electrical connector oriented to operationally mate with a first electrical connector of said head/disk assembly when said second electrical connector is disposed in alignment with said first electrical connector, and when said second printed circuit board is attached to said head/disk assembly, and with a third electrical connector having a plurality of resilient terminals attached to said second circuit board; and automatically electrically engaging said plurality of resilient terminals attached to said second circuit board with said plurality of electrical contacts on said first circuit board by aligning said second electrical connector to operationally mate with said first electrical connector while joining said second circuit board to said head disk assembly;

said method further comprising the steps of:

forming each of said plurality of resilient terminals with a proximal portion exposed by said third electrical connector;

orienting other portions of said plurality of resilient terminals in an array conforming to positions of said electrical contacts; and performing said step of mounting said third connector by positioning said proximal portions of said resilient terminals to operationally engage said second circuit board, with said other portions of said resilient terminals extending through said second circuit board to make an operational engagement with corresponding ones of said electrical contacts and to maintain said operational engagement by resiliently deforming while said second electrical connector mates with said first connector.

13. The process of claim 12, further comprising the step of mounting proximal portions of said plurality of resilient terminals on said second circuit board while positioning other portions of said plurality of resilient terminals in resilient suspension and spaced-apart from said second circuit board.

14. The process of claim 12, further comprising the step of forming each one of said plurality of resilient terminals of said third electrical connector with a distal portion operationally engaging said second circuit board and with another portion resiliently bowed to moveably protrude away from said second circuit board.

15. The process of claim 12, further comprising the step of forming each of said plurality of resilient terminals with a proximal portion disposed to operationally engage said second circuit board along a geometric construct, and with another portion bowed to protrude outwardly from said second circuit board and to resiliently deform along a direction transverse to said geometric construct as said second electrical connector is operationally mated with said first electrical connector.

16. The process of claim 12, further comprising the steps of:

establishing each of said plurality of resilient terminals within said third electrical connector with proximal portions of said plurality of resilient terminals being exposed by said third electrical connector;

bowing other portions of said plurality of resilient terminals to protrude resiliently beyond said third electrical connector in an array conforming to positions of said electrical contacts by positioning said proximal portions of said resilient terminals to operationally engage said second circuit board, and by positioning said other portions of said resilient terminals to extend through said second circuit board to make an operational engagement with corresponding ones of said electrical contacts, and to maintain said operational engagement by resiliently deforming when said second electrical connector operationally mates with said first electrical connector.

* * * * *